(12) United States Patent
Krasner (10) Patent No.: US 6,208,291 B1
(45) Date of Patent: Mar. 27, 2001

(54) HIGHLY PARALLEL GPS CORRELATOR SYSTEM AND METHOD

(75) Inventor: Norman F. Krasner, San Carlos, CA (US)

(73) Assignee: SnapTrack, Inc., San Jose, CA (US)

( * ) Notice: Subject to any disclaimer, the term of this patent is extended or adjusted under 35 U.S.C. 154(b) by 0 days.

(21) Appl. No.: 09/087,438

(22) Filed: May 29, 1998

(51) Int. Cl.[7] .................................................. H04B 7/185
(52) U.S. Cl. ............................ 342/357.12; 342/357.06; 701/213; 375/208
(58) Field of Search .................................... 342/352, 357; 701/213; 375/208

(56) References Cited

U.S. PATENT DOCUMENTS

| | | | |
|---|---|---|---|
| 4,426,712 | * 1/1984 | Gorski-Popiel | 375/96 |
| 4,660,164 | 4/1987 | Leibowitz | 364/728 |
| 4,841,544 | * 6/1989 | Nuytkens | 375/1 |
| 5,576,715 | * 11/1996 | Litton et al. | 342/357 |
| 5,600,328 | 2/1997 | Tachita et al. | 342/357 |
| 5,736,961 | * 4/1998 | Fenton et al. | 342/357 |
| 5,809,064 | * 9/1998 | Fenton et al. | 375/208 |
| 5,822,363 | * 10/1998 | Le Roy | 375/206 |

FOREIGN PATENT DOCUMENTS

| | | | |
|---|---|---|---|
| 0 488 739 A1 | 6/1992 | (EP) | G01S/5/14 |
| 0 526 040 A2 | 2/1993 | (EP) | G01S/5/14 |
| 2 016 760 | 2/1978 | (GB) | G06F/15/34 |
| WO 97/40398 | 10/1997 | (WO) | G01S/1/04 |

OTHER PUBLICATIONS

PCT Search Report mailed Sep. 30, 1998, 7 pages.
Spilker, Jr., J.J.; Signal Structure and Theoretical Performance; Chapter 3: GSP Signal Structure and Theoretical Performance; pp. 57–83; American Institute of Aeronautics and Astronautics, Inc.; 1994.

* cited by examiner

Primary Examiner—Thomas H. Tarcza
Assistant Examiner—Dao L. Phan
(74) Attorney, Agent, or Firm—Blakely, Sokoloff, Taylor & Zafman (57) ABSTRACT

A method and apparatus of acquiring and tracking satellite positioning system signals in a highly parallel correlator disclosed. A pseudo-random noise correlation operation is performed on an input satellite positioning system signal to provide a correlated output. The input satellite positioning system signal is input in parallel to a number of parallel correlators. Each parallel correlator contains a multi-correlator unit which processes and stores multiple phases of a correlated pseudo-random noise signal using common adder and multiplier circuitry.

27 Claims, 8 Drawing Sheets

HIGHLY PARALLEL GPS CORRELATOR SYSTEM AND METHOD

CROSS-REFERENCE TO RELATED APPLICATION

This application is related to Provisional U.S. Patent Application 60/050,647, entitled "Highly Parallel GPS Correlator System and Method", filed on Jun. 24, 1997 by the same inventor, Norman F. Krasner, and assigned to the assignee of the present invention.

FIELD OF THE INVENTION

The present invention relates generally to the field of global positioning systems, and more particularly to receiving and tracking satellite signals in a parallel correlation receiver system.

BACKGROUND OF THE INVENTION

Most conventional Global Positioning System (GPS) receivers utilize serial correlators in order to acquire, track, and demodulate signals transmitted from GPS satellites. The U.S. Global Positioning System (GPS) Orbital Constellation consists of 24 satellites or space vehicles (SV) which orbit the earth in 12 hour orbits. The satellites are arranged in six orbital planes each containing four satellites. The orbital planes are spaced 60 degrees apart from each other and are inclined approximately fifty-five degrees with respect to the equatorial plane. This constellation provides a user with approximately five to eight satellites visible from any point on earth.

Each transmitted GPS signal is a direct sequence spread spectrum signal. The signal available for commercial use is that associated with Standard Positioning Service (SPS) and utilizes a direct sequence bi-phase spreading signal with a 1.023 Mchip per second spread rate placed upon a carrier at 1575.42 MHz. Each satellite transmits a unique pseudo-random noise code (also referred to as the 'Gold' code) which identifies the particular satellite, and allows signals simultaneously transmitted from several satellites to be simultaneously received by a receiver, with little interference from one another. The pseudo-random noise (PN) code sequence length is 1023 chips, corresponding to 1 millisecond time period. In addition, data superimposed on each signal is 50 baud binary phase shift keyed (BPSK) data with bit boundaries aligned with the beginning of a PN frame; 20 PN frames occur over 1 data bit period (20 milliseconds).

A primary goal of a GPS receiver is to determine the time-of-arrival of the PN codes. This is accomplished by comparing (for each received signal) a locally generated PN reference against the received signal and "sliding" the local reference in time until it is time-aligned with the received signal. The two signals are compared with one another by a multiplication and integration process known as the correlation process. When the two signals are time aligned a large output results. Typical serial correlators used in current standard GPS receivers compare the local and received signals one time offset at a given time. If such a comparison is done every half-chip interval, 2046 comparisons (or tests) would be required to completely search over one PN epoch (1 millisecond). Such a search must be done in turn for each of the several of the satellites in view. In addition, errors in received signal frequency often require additional searches to be made for various hypotheses of signal frequency. The time to perform this search may be very lengthy, especially under low input signal-to-noise ratio situations. Conventional GPS receivers utilize a multiplicity of such correlators operating in parallel to speed up the acquisition process. In order to achieve rapid acquisition at very low received signal to noise ratios, an extremely high number (perhaps thousands) of such correlators may be required. A straightforward implementation of such a system would thus result in very complex, expensive circuitry.

It is therefore desirable to simplify the circuitry associated with correlators within GPS receivers. Such an architecture would effectively and efficiently implement the processing functions of a large number of correlators operating in parallel. It is further desirable to integrate a method for tracking received GPS signals, following the acquisition procedure, in which common components, such as common hardware, are used for both the acquisition and tracking functions.

SUMMARY OF THE INVENTION

The present invention discloses a method and apparatus for acquiring and tracking global positioning system signals with a parallel architecture GPS receiver. In a method of the present invention, all possible phases of a given pseudo-random noise sequence corresponding to a single GPS signal are processed in parallel.

In one embodiment of the present invention, the parallel correlator circuit for a channel within a GPS receiver contains a plurality of multi-correlator units. Each multi-correlator unit contains a pseudo-random noise generator and an N-stage delay circuit. The N-stage delay circuit processes each pseudo-random noise frame for N successive lags. The parallel correlators allow the acquisition and tracking of multiple frames of data comprising the received global positioning system signal. This results in a combination of acquisition and tracking functions in a common circuit featuring reduced complexity.

Other features of the present invention will be apparent from the accompanying drawings and from the detailed description which follows.

BRIEF DESCRIPTION OF THE DRAWINGS

The present invention is illustrated by way of example and not by way of limitation in the figures of the accompanying drawings in which references indicate similar elements and in which.

DETAILED DESCRIPTION

A method and apparatus for receiving global positioning system signals through a parallel processing receiver is described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form to facilitate explanation.

To clarify the description of the present invention, the following definitions are provided. A "correlation" means a comparison of two data sequences (typically a sampled signal and a locally generated reference signal), performed by multiplying the two sequences together term by term, summing the result, and computing the magnitude, or magnitude-squared, of the result. The multiplication operation may be complex if either sequence is represented as a set of complex numbers. This is often the case if in-phase and quadrature (complex) samples of an incoming signal are one of the sequences to be processed. In addition unknown carrier phase and/or frequency can be incorporated into a signal representation through use of complex representation.

According to the above definition, if a correlation is performed on two sequences of length n, then this correlation may be extended to length n+1 by one additional multiplication and addition; that is, samples numbered n+1 of the two sequences are multiplied and added to the previous correlation (prior to the magnitude calculation). This is referred to as "updating" the correlation. In many situations the correlation is computed though an updating process until a fixed number of samples are processed, and then this final correlation result is either compared to a threshold or is further processed. The correlation then begins anew, i.e., the updating begins with the value zero. This procedure is often termed "integrate and dump".

In certain applications, the relative phasing of an incoming data sequence and a locally generated sequence may be unknown a priori. Hence, to determine this phasing, a series of correlations are performed in which the relative phase of the two sequences is altered from one correlation to the next. The first sequence may be fixed and the second sequence delayed to perform such a set of correlations, or the second sequence may be fixed and the first sequence delayed to perform such a set of correlations; or a combination of the two techniques can be performed. These cases are considered separately in the present invention. A particular relative phasing between two sequences is termed a "lag", where this term comes from its relation to delay.

A collection or group of correlations, performed simultaneously, or nearly simultaneously, as described in the above paragraph, is termed a "multi-correlation". For example, a multi-correlation may correspond to the computation of N correlations having lags 0 to N−1 samples. This is distinguished from a serial correlation, in which one correlation is performed on the two sequences, the result is dumped, and then a second correlation is performed on a separate portion of at least one of the sequences, and so on. There is no inherent parallelism in this type of structure.

As in the previous paragraph it may be the case that one desires to compute a set of different correlations which differ from one another by the relative phasings of the two sequences. This is especially the case when the sequences are periodic. The set of all such phasings in the periodic case is termed a "periodic correlation function", or sometimes just a "correlation function." That is, the correlation function is a collection of correlations that spans all possible phasings of the two sequences.

Figure 1:
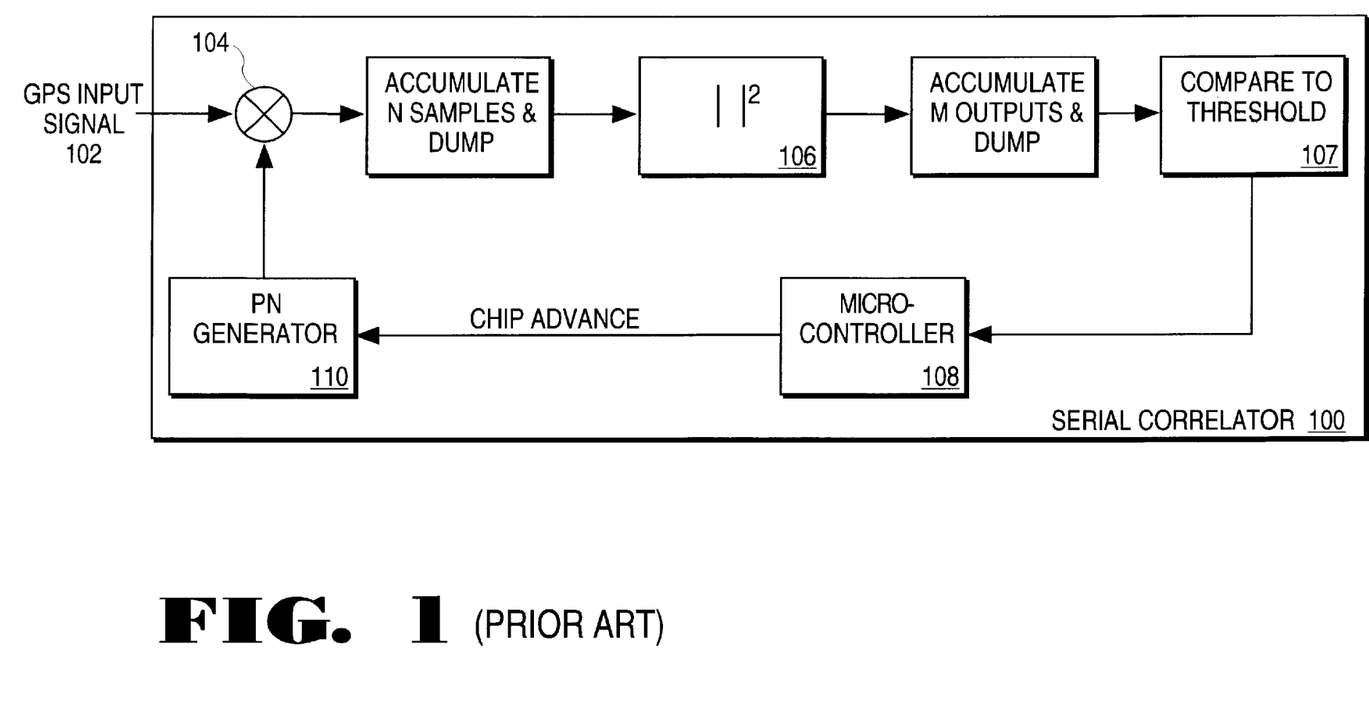
FIG. 1 is a block diagram representation of a prior art global positioning system correlator circuit.

Global Positioning System (GPS) receivers receive GPS signals transmitted from orbiting GPS satellites and determine the time-of-arrival (TOA) of unique pseudo-random noise (PN) codes by comparing the time shift between the received PN code signal sequence and an internally generated PN signal sequence. As described above, the signal comparison is performed in a correlation process which entails multiplying and integrating the received and generated signals. A typical prior art serial correlator circuit utilized in common GPS receivers is illustrated in FIG. 1. The correlator 100 receives an input GPS signal 102 and combines, in multiplier 104, the received signal 102 with an internally generated PN code produced by a PN generator 110. A magnitude squaring operation 106 is then performed on an accumulated set of samples of the combined signal. Comparator 107 indicates when a match between the received and internally generated PN code has occurred based upon a pre-set threshold level. A micro-controller 108 receives the interrupt signals transmitted by comparator 107, and controls the sequencing of PN chips generated by PN generator 110.

According to the system of correlator 100, the received signal 102 is compared to the sequenced PN chips one time offset at a time, thus requiring a multitude of comparisons over one PN epoch. For example, if a comparison were performed every one-half chip interval, 2046 comparisons would be required to completely search over one PN epoch. In order to speed the acquisition process, a conventional GPS receiver might use a multiplicity of correlators 100 in parallel. In this case, 2046 such correlators would be required to perform the comparison operations every one-half chip interval. Thus, the conventional method clearly requires complex correlator circuitry in order to provide sufficiently fast acquisition.

Parallel Correlator

An improved acquisition circuit for use in GPS receivers, according to one embodiment of the present invention, utilizes common hardware that is time-shared among a large number of correlator channels to produce a multiplicity of time offsets, or "lags", which are processed in parallel, rather than serially as in prior systems.

Figure 2:
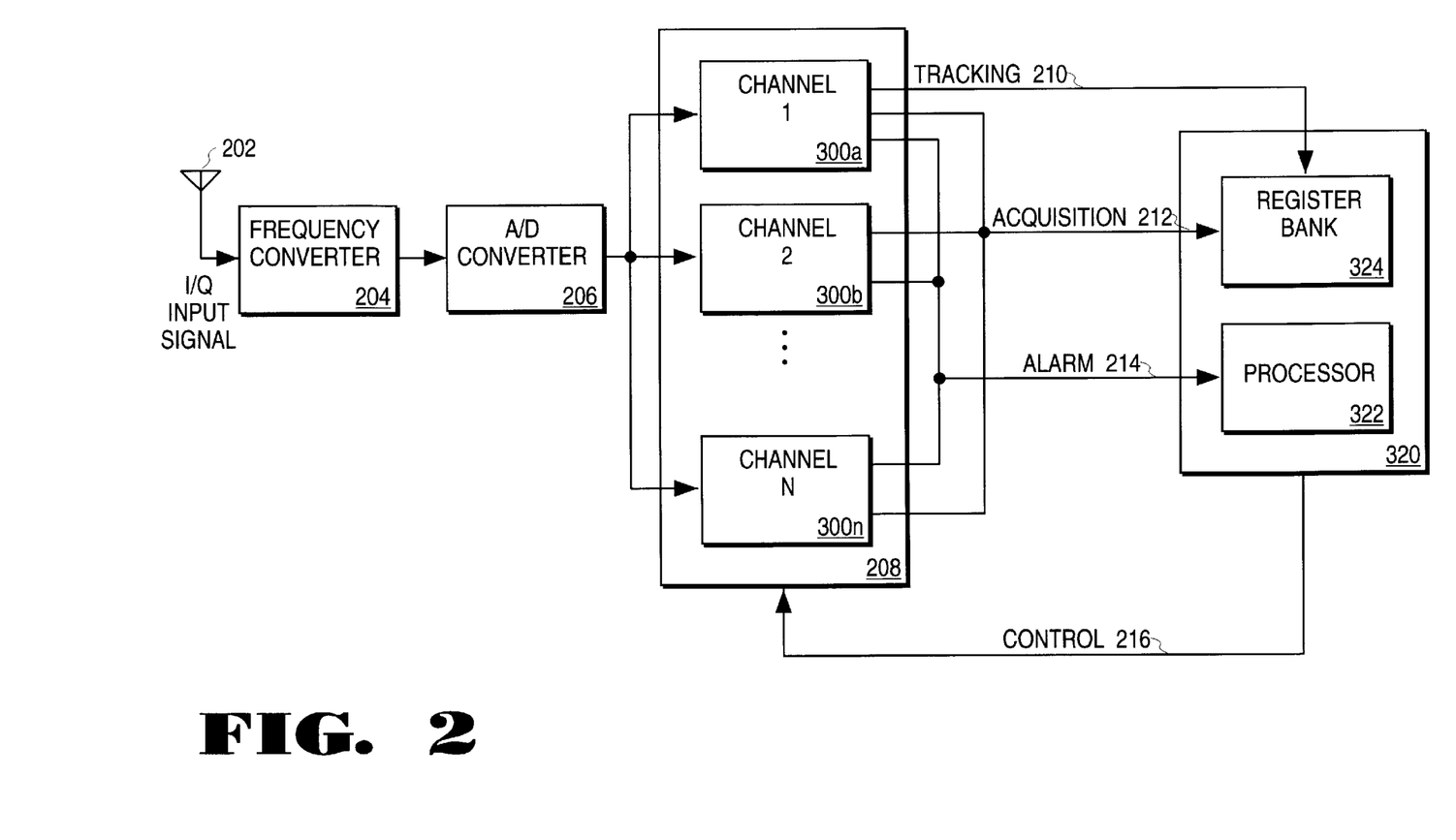
FIG. 2 is a block diagram representation of a global positioning system receiver incorporating a highly parallel correlator circuit according to one embodiment of the present invention.

FIG. 2 illustrates a GPS acquisition circuit comprising separate correlator circuits for multiple input channels. The input baseband signal from satellites in view are received by antenna 202. The input baseband signal is composed of separate in-phase (I) and quadrature (Q) components. This signal is input to frequency converter 204 which converts the input radio frequency signal (RF) to an intermediate frequency (IF). The intermediate frequency signal is then converted from an analog signal to a digital bitstream in analog-to-digital (A/D) converter 206. The digital bitstream from A/D converter 206 is then input to correlator circuit 208.

Correlator circuit 208 contains one or more parallel correlators, each performing a correlation operation for an individual channel, each channel being dedicated to a particular satellite in view. In FIG. 2, parallel correlator circuits 300a–300n are illustrated for channels 1 to N. In a receiver used for the standard GPS orbital constellation, 10 parallel correlators 300 may be provided (N=10) to enable the receiver to acquire and track signals from the 5 to 8 satellites that typically may be in view under most conditions. The acquisition signal 212 from each channel is input to a register bank 324 within processing unit 320. A tracking signal 210 is input to register bank 324 from the channel 1 parallel correlator 300a. In an alternative embodiment of the present invention, tracking signal 210 may be output from any of the other channels 2-N or a combination of any such channels. An alarm signal 214 from each parallel correlator 300a–n is input to processor 322 within circuit 320. Circuit 320 provides a feedback control signal 216 to correlator circuit 208. The feedback control signal 208 comprises Doppler compensation data among other control signals.

Figure 3A:
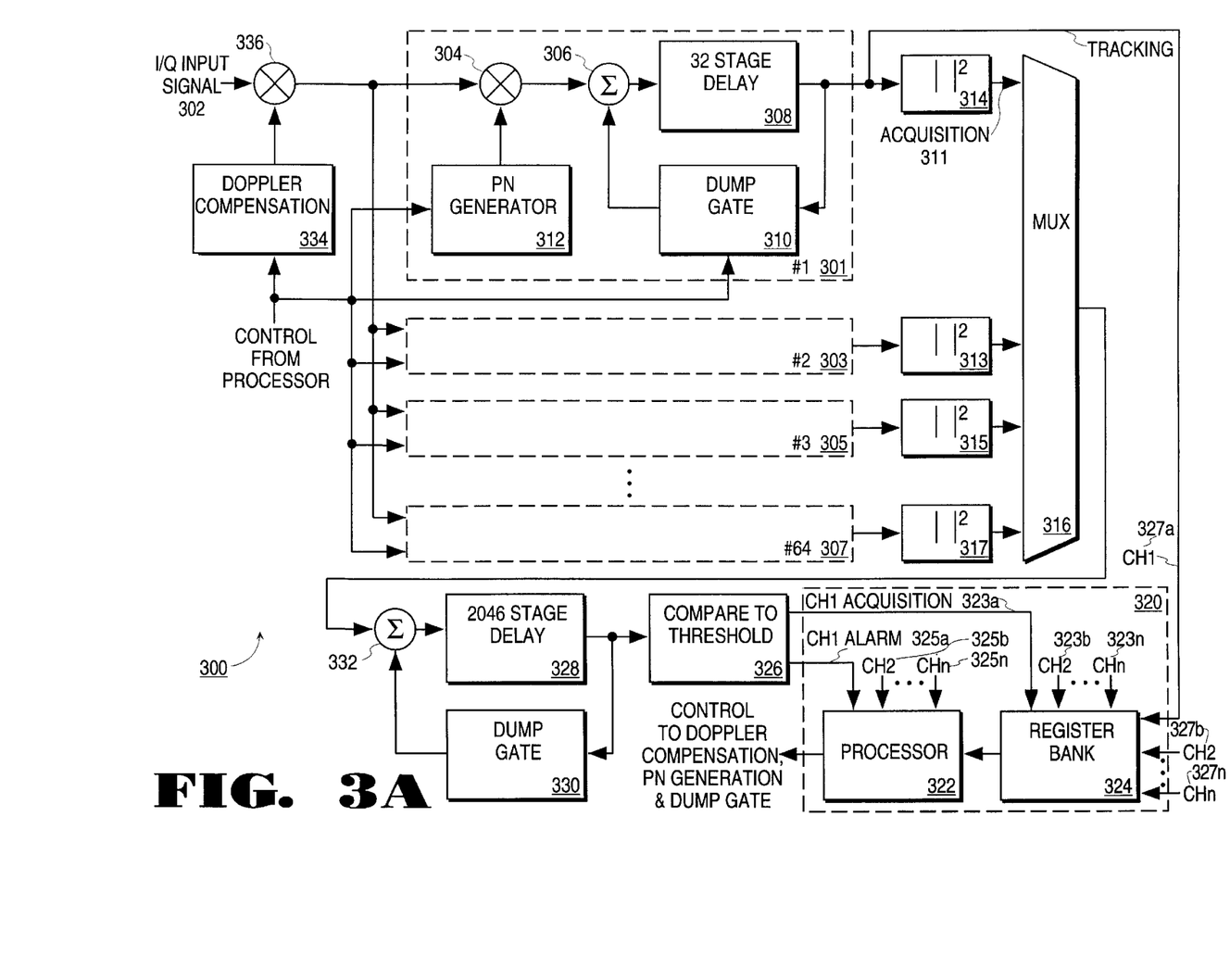
FIG. 3A is a block diagram representation of a global positioning system correlator circuit according to one embodiment of the present invention.

FIG. 3A provides a detailed block diagram of a parallel correlator circuit according to one embodiment of the present invention. The circuit of FIG. 3A consists of a parallel correlator 300 and a processor/memory circuit 320. Parallel correlator 300 can process in parallel all possible phases of a given PN sequence corresponding to a single GPS signal. Parallel correlator 300 represents a single channel parallel correlator, such as channel 1 parallel correlator 300a of parallel correlator circuit 208 in FIG. 2. A multiplicity of such structures 300 can be constructed to process in parallel a multiplicity of GPS channels, as illustrated in FIG. 2.

Parallel correlator 300 of FIG. 3A effectively implements 2046 individual correlator circuits. The input signal 302 is input in parallel to 64 separate multi-correlator units. Multi-correlator unit 301 illustrates the components within each multi-correlator unit. FIG. 3A contains block structures for the second unit 303, the third unit 305, and the 64th unit 307. It should be understood that the structures for multi-correlator units 2–64 contain the same elements illustrated in first multi-correlator unit 301. By utilizing individual multi-correlator units, each of which processes a multiplicity of PN lags, the overall complexity of the correlator circuit 300 is dramatically reduced.

Each of the multi-correlator units performs the function of 32 parallel correlators. As illustrated for the first unit 301, each multi-correlator unit contains a PN generator 312 that is time shared among 32 successive PN one-half chip phases, or "lags". PN generator 312 produces replicas of the C/A (coarse/acquisition) code for any one of the satellites in the GPS constellation. Each lag represents a particular time position associated with the PN frame. As one data sample is input to parallel correlator 300, it is multiplied by each of 32 successive half-chips from the PN generator 312 and summed with similar results for previous data samples using the loop integrator composed of adder 306 and delay line 308. The multi-correlator unit 301 is run at 32 times the PN sample rate (e.g., 32×2.046 MHz) and thus the unit utilizes a clock that may be considered to have 32 phases. In each phase (approximately 1/64 microsecond in length), a particular PN lag is processed. When the next data sample is input, the process repeats, except that the PN generator 312 is advanced one-half chip.

The output from 32-stage delay 308 is dumped once per PN frame or a multiple thereof. Each multi-correlator unit processes a separate group of 32 lags. The first unit 301 processes lags $0 \geq 31$; the second unit 303 processes lags $32 \geq 63$; the third unit 305 processes lags $64 \geq 95$; and so on until the 64th unit 307 which processes lags $2016 \geq 2047$. Thus, after 65,472 clock cycles (32×2046 clock cycles) one PN frame has been processed for 32 successive lags. In one embodiment of the present invention, the 32-stage delay circuit 308 may be implemented in memory in which the output from multiplier 304 is written to successive addresses. The data is read from a particular address, added to the input signal in adder 304, and the sum is written to the same address. The address counter is then advanced, and the process repeated. In the 32-stage delay, this operation is performed 32 times.

The output of the loop integrator within multi-correlator unit 301 is output from the 32-stage delay 308 to squaring circuit 314 to remove effects of carrier frequency error and data inversions. Each of the 64 multi-correlator units contains its own dedicated squaring circuit. For example, the output from the loop integrator for the second multi-correlator unit 303 is output to squaring circuit 313; the output from the loop integrator for the third multi-correlator unit 305 is output to squaring circuit 315; and the output from the loop integrator for the 64th multi-correlator unit 307 is output to squaring circuit 317. Only 32 successive outputs from the multi-correlators need to be processed by the squaring circuits at the end of each PN frame.

The output signals from all 64 multi-correlator loops are input to a multiplexer 316 which produces a single output signal from the 64 input signals. The output from multiplexer 316 is transmitted to a following loop integrator which comprises a 2046-stage delay 328, dump gate 330, and adder 332. This loop integrator provides post-detection integration of all the constituent correlators (2046 in number). Note that since the dump rate at the output of multiplexer 316 corresponds to the PN frame rate for each of the 2046 correlators, the average data rate into the following post-detection integrator is only 2.046 Msamples/sec. Hence, the following post-detection loop integrator may be implemented with relatively inexpensive circuitry. It should be noted that, like the 32-stage delay 308, the 2046-stage delay circuit 328 may be implemented in memory in which the output from multiplexer 316 is read from and written to successive addresses. The data is read from a particular address, added to the input signal in adder 332, and the sum is written to the same address. The address counter is then advanced, and the process repeated. In the 2046-stage delay, this operation is performed 2046 times.

The output signal from delay circuit 328 of the post-detection loop integrator is input to a comparator 326. Comparator 326 compares the post-detection output signal against a predetermined threshold value. If the post-detection output signal exceeds the level of the threshold, an alarm signal 325a is transmitted to processor 322. According to one embodiment of the present invention, processor 322 receives separate alarm signals 325a–325n from each of the parallel correlator circuits for channels 1-N within correlator circuit 208. Processor 322 provides a control output to Doppler compensation unit 334 and the PN generator 312 and dump gate circuits 310 within each of the 64 multi-correlator units 301–307. The output from the Doppler compensation circuit 334 is combined with the I/Q input signal 302 in multiplier 336.

The threshold comparator circuit 326 also produces an acquisition signal 323a which may be used for more precise time-of-arrival measurement. Acquisition signal 323a, which represents the acquisition signal for channel 1 parallel correlator 300a, is input to register bank 324 within processing unit 320. According to one embodiment of the present invention, register bank 324 also receives separate acquisition signals 323b–323n from each of the parallel correlator circuits for channels 2-N within correlator circuit 208. Register bank 324 stores data in the vicinity of the threshold crossing detected by threshold comparator 326. It should be noted that register bank 324 may be implemented in a memory with addressable storage locations.

The theory behind the preceding circuit description is now explained. Normally, the input sample rate is a multiple of the chip rate. If the input signal contains a transmitted waveform matched to a given correlator, the data out of multiplexer 316 will contain a narrow spike corresponding to lags spanning a width of approximately one chip duration. One spike will occur for each frame period and provides time-of-arrival information, modulo one PN frame period. If squaring circuits 311–317 were deleted, then the signal, being quadrature represented, produces a spike which is a complex number. Its polarity reverses in phase at the data baud boundaries in accordance with the transmitted data stream. In addition, the phase angle may be slowly advancing or retarding in time due to small frequency differences between the received signal carrier frequency and the locally generated frequency.

When the signal is very weak, e.g., due to blockage by objects such as trees or buildings, each of these spikes may be obscured by noise and hence are not directly usable for time-of-arrival measurement. To build up the energy of the spikes, the output of the multi-correlator units may be detected via a square-law operation, in order to remove the effect of varying phase angles. The energy from one PN frame is then added to that of the previous frame through a delay line integrator (e.g., 328). For a delay of one PN frame, a spike from a previous frame will be delayed by exactly one PN frame, and hence this energy will exit the delay line just as the spike from the next frame is about to enter the delay line. The spikes are then added together by the adder circuit 332 to produce a stronger spike. The random portions of noise will be incoherently added (a DC level will be increased) and hence will only grow as the square-root of the number of frames so summed. The DC level associated with the noise may be determined through an averaging process at the integrator output and subtracted from this final output. This eases the determination of an appropriate detection threshold in comparator 326.

In one embodiment of the present invention, parallel correlator 300 can also be used to perform tracking of GPS signals as well as signal acquisition, thus allowing a common hardware to be used for both tracking and acquisition. During tracking of a GPS signal, only a small subset of PN lags need to be examined at a rate of approximately once per PN frame. Thus data may be extracted from the multi-correlator units and passed to a register bank at the appropriate times which correspond to the times in which the signal is in the vicinity of an initial acquisition threshold crossing. The microprocessor may then perform tracking and demodulation functions within its circuitry in a standard manner. The microprocessor feeds back signals to the Doppler compensation circuitry, PN circuitry and dump gates in order to maintain proper tracking, during this operation.

For a tracking operation, register bank 324 receives a tracking signal 327a from multi-correlator unit 301. Tracking signal 327a is generated from the output of 32-stage delay circuit 308 for the first multi-correlator unit. It should be noted, however, that tracking signal 327a could also be generated from the output of any of the other 64 multi-correlator units 303–307, or a multiplexed output from any combination of the multi-correlator units 301–307. According to one embodiment of the present invention, register bank 324 receives separate tracking signals 327b–327n from each of the parallel correlator circuits for channels 2-N within correlator circuit 208.

According to an alternative embodiment of the present invention, the parallel correlator circuit 300 may be reduced in complexity by not processing in parallel 2046 lags but only a subset of 2046 lags. In this case, parallel correlator circuit 300 would "step" through a portion of such lags at a time.

According to a further alternative embodiment of the present invention, it is possible to utilize the circuitry of parallel correlator 300 solely to perform acquisition, and to use entirely separate circuitry from parallel correlator 300 to perform the tracking operations.

U.S. Pat. No. 4,426,712 to Gorski-Popiel describes another technique for providing parallel correlation in global positioning system receivers.

Timing Analysis

Figure 4A:
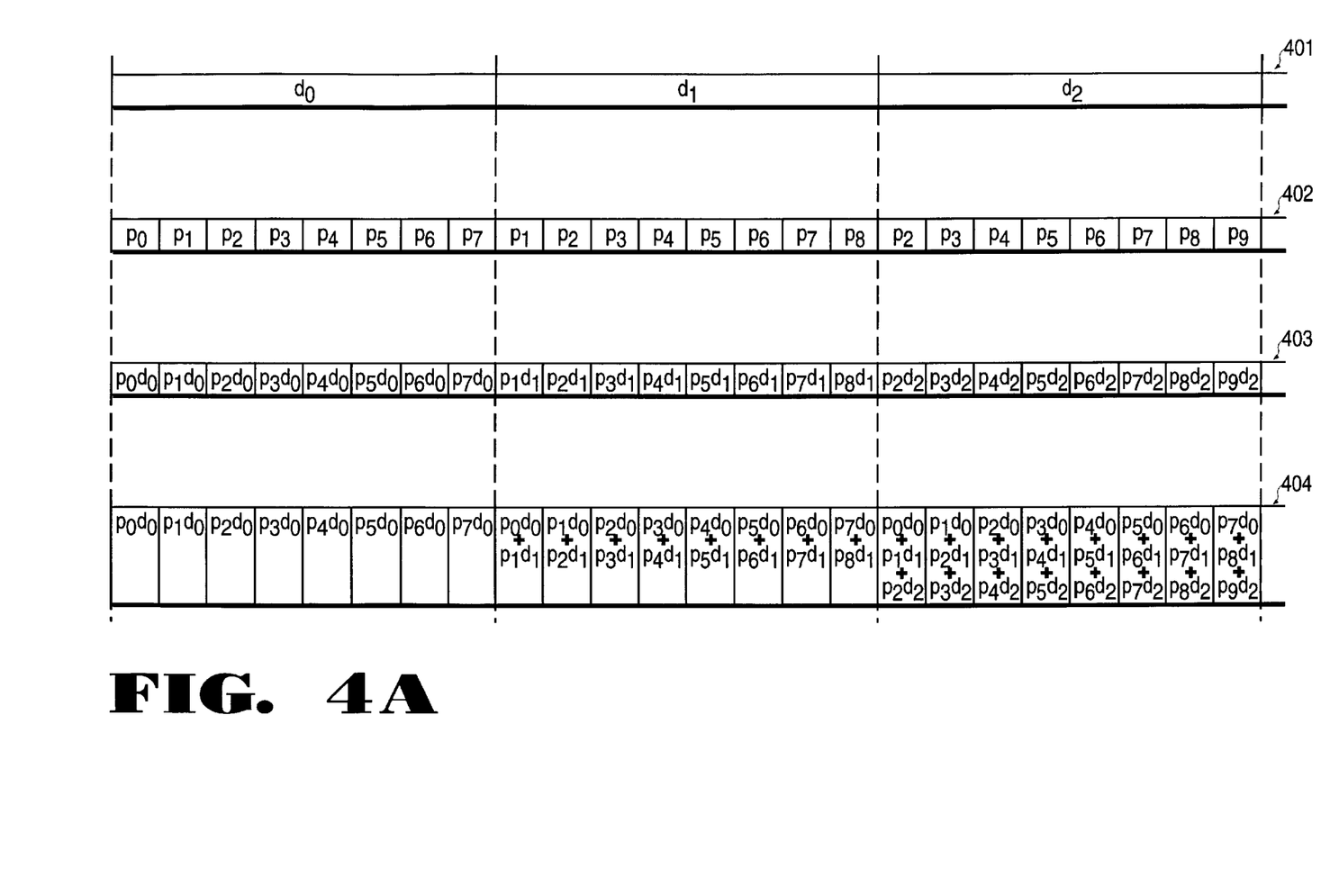
FIG. 4A provides a timing analysis of the operation of the parallel correlator of FIG. 3A.

FIG. 4A provides a timing and data analysis of the operation of the multi-correlator unit 301 of FIG. 3A. For illustrative purposes, the input and Doppler compensation circuitry 336 and 334 are initially ignored. Also for simplicity, it is assumed that an 8-stage delay is used instead of a 32-stage delay for delay line 308. In FIG. 4A, it is further assumed that the input sample rate of input signal 302 is one sample per chip and that data is real, rather than quadrature sampled.

At the beginning of the processing sequence, delay line 308 contains all zeros. The input data stream is denoted as $D=d_0, d_1, d_2, \ldots$, and is of a rate of approximately 1.023 Msamples per second. The locally generated PN stream is denoted by $P_0=p_0, p_1, p_2, \ldots p_{n-1}, p_0, p_1, p_2, \ldots, p_{n-1}, \ldots$, and consists of a series of numbers assuming values of +1 or −1. The period of the PN stream is n chips and this period is referred to as the "frame length".

A standard correlator, such as that illustrated in FIG. 1, multiplies the input data stream ($d_0, d_1, d_2, \ldots$) by the locally generated PN sequence ($p_0, p_1, p_2, \ldots p_{n-1}, p_0, p_1, p_2, \ldots$) and sums the result. If the input data stream contains a signal with this PN sequence, and if it is in time alignment with the PN sequence, a large output results. That is, in the absence of noise, if $d_0=p_0$, $d_1=p_1$, $d_2=p_2$, etc. ..., then, except for a possibly complex scale factor, the multiplication operation will remove the polarity inversions of the PN sequence and allow a coherent summation. If, however, the locally generated PN sequence is not time aligned with the input data stream D, another time alignment must be tried. The second time alignment typically consists of the original data stream shifted by one chip (or less for higher sample rates). These time displacements, or more precisely, circular shifts, are called "lags". For example, the new sequence $P_1=d_1, d_2, d_3, \ldots$ may be tried. In general then, at least 1023 different sequences, or lags of the original input data sequence must be tried in order to ensure that all possible phases of the input data relative to the locally generated PN have been examined. Again, it is assumed that the sample rate equals the chip rate. In practice, however, the signal sample rate is often two samples per chip and the delays between the locally generated PN sequence and the received data signal are adjusted in increments of one-half chip or less in order to avoid losses due to partial alignment.

As discussed above, conventional correlators either use one correlator element and sequentially try all phases of the local reference relative to the received signal, or else utilize a multiplicity of such elements in order to speed up the search time. Typically a correlator must integrate over approximately 10 PN frames (10 milliseconds) in order to achieve sufficient signal energy to ensure good probability of detection. Hence, searching over 1023 possible lags can take up to 10 seconds. This process must be performed for a multiplicity of the GPS signals that are received in order to provide timing information from at least four of the satellites in view (for a three position fix).

FIG. 4A illustrates how multi-correlator unit 301 within parallel correlator 300 can compute the correlation function for a large number of lags, with a common set of hardware. In this case, the hardware requirement is much less than would be the case if separate correlators, utilizing separate hardware, were used. The input data stream 401 is denoted as $D = d_0, d_1, d_2, \ldots$. The input data stream corresponds to input signal 302 which is input to adder 306 in multi-correlator unit 301. In FIG. 4A, data stream 401 is illustrated as consisting of windows $d_0$, $d_1$, and $d_2$, it is understood however, that data stream 401 is typically of length 1023 for a standard C/A signal. The rate of data stream 401 is approximately 1.023 Msamples per second. The PN generator 312 produces a repetitive PN stream 402 denoted by $P_0 = p_0, p_1, p_2, \ldots P_{n-1}, p_0, p_1, p_2, \ldots, p_{n-1}, \ldots$ FIG. 4A illustrates a PN stream 402 generated by PN generator 312 for n=8 (corresponding to a frame length of eight). Note that the PN generator is run (for this example) at a rate of 8 times the input data rate. Hence for the first input data word, the PN generator 312 cycles through the first 8 chips of the sequence. Each time the PN generator 312 is clocked, its output is multiplied by the input data word by the multiplier 304, passed through the adder 306 and placed in the delay line 308 (for this example the delay line of length eight).

The multiplication operation is illustrated as line 403 of FIG. 4A which represents the data at the output of multiplier 304 within multi-correlator unit 301. Note that after the PN generator provides 8 chips, a new data sample enters (e.g., $d_1$ in place of $d_0$) and PN generator 312 is reset, but not to the phase that was used at the start of the previous signal sample. Instead, it is set to a phase displaced by one chip from that phase. For example, corresponding to data sample $d_0$, the successive PN chips provided by the generator 312 are $p_0, p_1, p_2, \ldots p_7$. For the second data sample $d_1$, the PN chips provided are $p_1, p_2, \ldots p_8$, and so on.

Line 404 of FIG. 4A illustrates the sequence of data provided at the output of adder 306 and stored in delay line 308. Line 404 represents a standard correlation between the sequence $p_0, p_1, p_2, \ldots$ and the data $d_1, d_2, d_3, \ldots$ A correlation over one frame of data would be complete after n samples, where n equals the frame length. Examining the first output of the adder right after each sample arrives yields a first data sample of $p_0 d_0$, a second data sample of $p_0 d_0 + p_1 d_1$, a third data sample of $p_0 d_0 + p_1 d_1 + p_2 d_2$, and so on. Examining the second outputs of adder 306 right after each data sample arrives yields $p_1 d_0$, $p_1 d_0 + p_2 d_1$, $p_1 d_0 + p_2 d_1 + p_3 d_2$, and so on. This represents a correlation between the delayed sequence $p_1, p_2, p_3, \ldots$ and the data, that is, a correlation with lag 1. Similarly, it is apparent that the successive outputs of adder 306 provided during each data sample period corresponds to lags 0 through 7. Effectively, the delay line 308 and the resetting of the PN generator 312 provides for a timesharing of multiple correlation lag channels, without any loss of information.

In practice, multi-correlator unit 301 would provide for 32 successive lags, rather than 8 in the above example. Furthermore, each of these lags would be one-half chip delayed relative to a prior lag, instead of one-chip delayed as in the above example. If multiple channels of multi-correlator units 301 are used, then each would be assigned a different set of lags and hence each would produce a PN sequence displaced in time from that of an adjacent channel by 32 lags. For example, if PN generator 312 of the first multi-correlator unit 301 produces the sequence $p_0$, $p_1, \ldots, p_{31}, p_1, p_2, \ldots, p_{31}$, then the PN generator of the second multi-correlator unit 303 would simultaneously produce the sequence $p_{32}, p_{33}, \ldots, p_{63}, p_{33}, p_{34}, \ldots, p_{63}$. Clearly then, 64 of these multi-correlator channels 301–307 will produce all the lags for an entire PN frame. This corresponds to 2046 lags for 1023 chips delayed by one-half chip per lag. The last two lags, provided by multi-correlator unit 307, are extraneous (actually they are the same as lags 0 and 1), since the frame length is 1023 chips or 2046 half chips.

The correlation outputs from the delay line of each multi-correlator channel are passed through magnitude-squaring circuits (e.g., 314). The correlation process cannot be run indefinitely since data phase inversions in the received signal will end the coherent integration gain; in addition small Doppler errors will also end this gain. Often the correlation process is ended after each PN frame period, and the dump gate 310 is opened at this time for 32 successive PN samples, to allow correlation to begin anew. The data from the previous correlation period is passed through the aforementioned magnitude-squaring circuit 314 and then combined with similar outputs from other correlation channels 303, 305, etc. (if present), through multiplexer 316. For this purpose, it may be advantageous to have the dump gates 310 of the various multi-correlator units (301, 303, 305, etc.) operate at times displaced from one another. In this case, the operation of multiplexing all the data from the various channels into one stream is simplified.

For example, in FIG. 3A, at the end of a PN frame, multi-correlator unit 301 produces 32 successive lag outputs corresponding to one entire PN frame. If the time of the dump gate opening of multi-correlator unit 303 is displaced in time by 32 clock cycles, then the data provided by multi-correlator unit 303 at the end of a PN frame will not overlap in time the data from multi-correlator unit 301. Thus, events can be timed such that 2046 samples would be burst out through multiplexer 316 at the end of each PN frame without overlapping one another in time. This data, which has been squared in magnitude (or "detected"), then enters the delay line integrator made up of 2046-stage delay line 328 and adder 332. This circuit adds the detected data from one PN frame to that from the previous frames. This is due to the fact that the delay line 328 exactly equals the length of one PN frame, so that data emerging from it arrives exactly at a time coincident with one PN frame duration. The summation operation performed by adder 332 continues as long as desired, consistent with desired signal sensitivity and acquisition time, and is terminated by dump gate 330 being opened for one PN interval. Data from the delay-line integrator is compared to a detection threshold in comparator 326 to detect the presence of a signal. Comparator 326 generates an alarm signal 325*a* to processor 322 upon a threshold crossing. This alarm signal allows the measurement of time-of-arrival through the time that such an alarm is sent. The times of the alarm interrupts may be read by processor 322 using an internal counter (not shown) within the processor, or one external to it.

The values of the data at the threshold crossing and in the vicinity of the threshold crossing may be used together with standard interpolation algorithms to refine the precise location of the correlation peak. The data magnitudes may be stored in register bank 324 to allow this interpolation to be performed by processor 322. This approach can permit measurement of such an arrival time to an accuracy as much as 100 times better than the time interval between data samples (which is approximately 500 nanoseconds).

As illustrated in FIG. 2, processor 322 may receive threshold crossing information from a multiplicity of channels, 1-N. In this case, each channel may be assigned to a PN code for a unique satellite. In an alternative embodiment of the present invention, one or more channels may sequentially search through a series of PN codes. In a further alternative embodiment, several channels may be assigned the same PN code but different Dopplers (through Doppler compensation circuit 334). This may be an effective acquisition strategy when the initial Doppler uncertainty is high and where certain satellites are preferable (e.g., higher in the sky).

Following the above initial acquisition, if a sufficiently high signal-to-noise ratio is available, a tracking process may begin in which the PN epochs and carrier are continuously tracked and the satellite data message may be read by removal of the PN data. These operations may be performed by setting a group of correlators to epochs that are in the vicinity of the time of the threshold crossing of a particular satellite. During this time, the dump gate 310 is normally set to a rate that is a multiple of the data rate, e.g., 100 Hz. The correlator output is taken in pre-detected (in-phase/quadrature) form just prior to magnitude-square block 314, and stored in register bank 324 which is accessible by processor 322. Storage of pre-detection data preserves signal phase information and is necessary to perform carrier tracking and data demodulation. The PN tracking loop can force the location of the correlation peak to stay in a particular time position by means of a control signal from the processor sent to the clocking mechanism of PN generator 312. This control signal causes the PN generator to advance or retard its phase in order to keep the correlation peak location fixed. Similarly the information in register bank 324 may be used by processor 322 to compute any error in carrier frequency using a standard phase-lock loop tracking method (e.g., a Costas loop). The processor 322 then feeds back correction frequencies to the Doppler compensation digital oscillator 334 to force the carrier frequency out of multiplier 336 to be zero.

Following carrier and PN tracking operations, data collected in register bank 324 has the PN component removed so that this data may be read. The processor 322 controls dump gate 310 so that the dump times are properly aligned with the data boundaries. This may be accomplished by utilizing a data tracking loop within processor 322, and providing a feedback signal to dump gate 310, and each of the dump gates in the other multi-correlator units 303–307. Alternatively, if the dump rate is very high (e.g., 1 kHz), then processor 322 may perform all such data tracking itself by manipulating the data stored in register bank 324, without such dump gate feedback. This latter approach, however, requires higher processor speed.

As illustrated in FIG. 3A, one group of 32 multi-correlator units 301 per satellite signal being tracked is more than adequate to provide the necessary information for tracking and demodulation of satellite signals. In fact, during tracking, only the peak correlator output and those just prior to and after the peak need be utilized for these functions. The additional multi-correlator units of a group like 301 can be used for dropout situations to rapidly re-search for the location of a correlation peak that may have moved during this dropout period.

Alternative Parallel Correlator

Figure 3B:
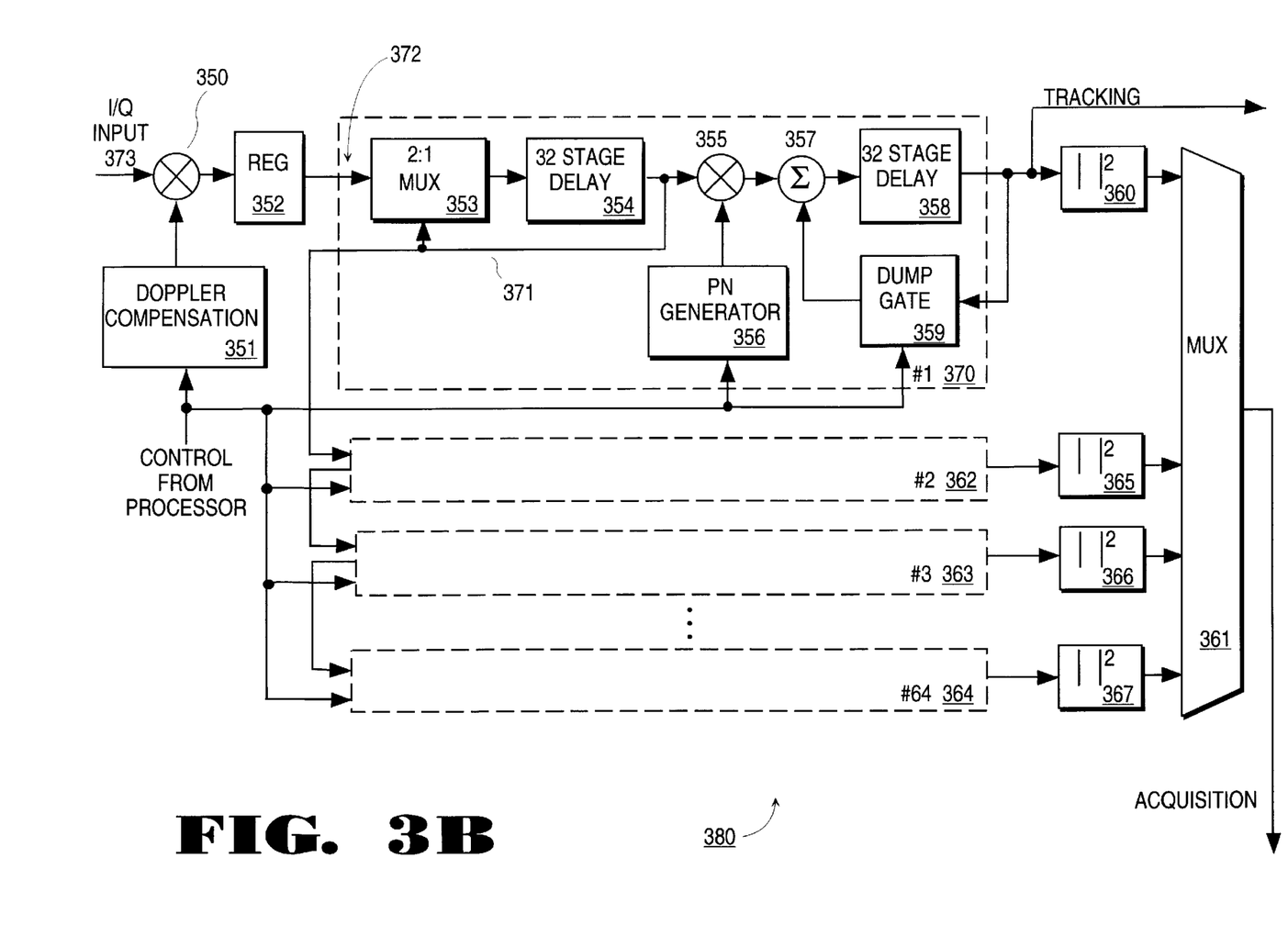
FIG. 3B is a block diagram representation of a global positioning system correlator circuit according to an alternative embodiment of the present invention.

FIG. 3B provides a detailed block diagram of a parallel correlator circuit according to an alternative embodiment of the present invention. Unlike the parallel correlator illustrated in FIG. 3A which computes the correlation function for multiple lags by correlating a common portion of the input data stream ($d_0$, $d_1$, $d_2$, . . . ) against multiple PN sequences, each displaced from one another by one chip, the alternate parallel correlator of FIG. 3B uses a common portion of the PN signal which is correlated against delayed versions of the input data stream. The parallel correlator of FIG. 3B is similar to the parallel correlator of FIG. 3A with the addition of an extra delay line loop in the signal path prior to the PN generator/mixer circuit.

Figure 4B:
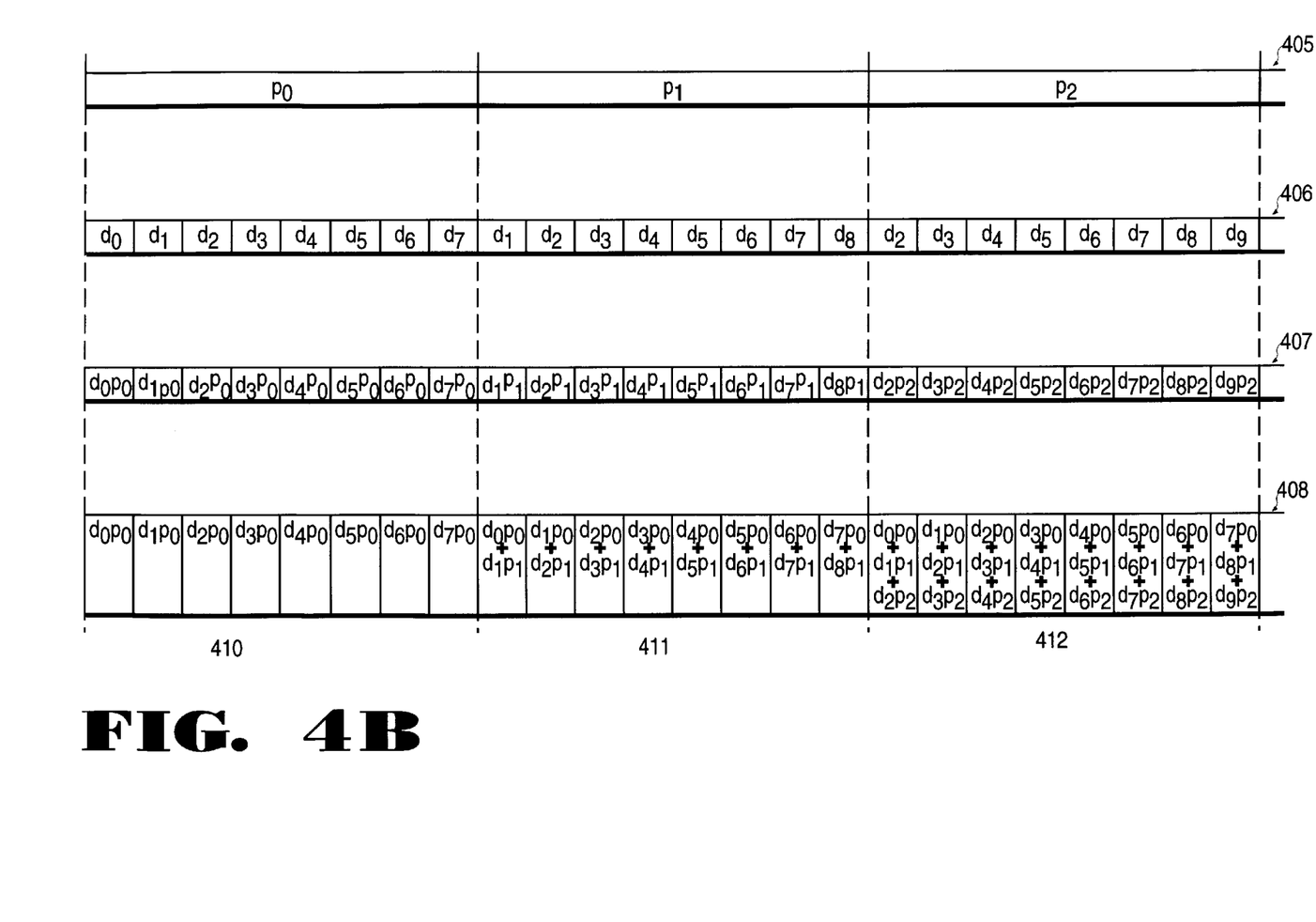
FIG. 4B provides a timing analysis of the operation of the parallel correlator of FIG. 3B.

FIG. 4B provides a timing and data analysis of the operation of the multi-correlator unit of FIG. 3B. For illustrative purposes, the input and Doppler compensation circuitry is initially ignored. For further clarity, it is assumed that an 8-stage delay is used instead of a 32-stage delay for delay line 308. In FIG. 4B, it is also assumed that the input sample rate of input signal is one sample per chip and that data is real, rather than quadrature sampled. FIG. 4B is similar to FIG. 4A, except that the p and d terms, corresponding to the PN and data sequences respectively, are reversed.

Like the parallel correlator of FIG. 3A, the parallel correlator 380 of FIG. 3B effectively implements 2046 individual correlator circuits. The input signal is input in parallel to 64 separate multi-correlator units. Multi-correlator unit 370 illustrates the components within each multi-correlator unit. FIG. 3B contains block structures for the second unit 362, the third unit 363, and the 64th unit 364. It should be understood that the structures for multi-correlator units 2–64 contain the same elements illustrated in first multi-correlator unit 370. As illustrated for the first unit 370, each multi-correlator unit contains a PN generator 356 that is time shared among 32 successive PN one-half chip phases, or "lags".

In FIG. 3B, an I/Q input signal 373 is passed through the Doppler compensation circuitry containing compensation circuit 351 and multiplier 350, and is then loaded into register 352. The multi-correlator unit 370 is run at 32 times the rate at which register 352 is loaded, that is, 32 operations take place each time a new word of data is loaded into register 352. As stated earlier, the following discussion assumes that 8-stage delays are used instead of the 32 indicated in FIG. 3B, and that the sample rate is one sample per PN chip. It is assumed initially that the delay line 354 contains input data $d_0$ . . . $d_7$ where these data words are in time sequence (i.e., $d_0$ comes first, and $d_7$ comes last), and $d_0$ is at the very right of the shift register delay line 354 and $d_7$ is at the left. The data in delay line 354 is multiplied by the first PN chip from PN generator 356 using multiplier 355, and then stored in the loop accumulator containing adder 357, delay line 358, and dump gate 359.

As shown in the timing diagram of FIG. 4B, the first chip $p_0$ is multiplied by the first data word $d_0$ by multiplier 355 and then placed into delay line 358. Delay line 358 is assumed to be initially empty and dump gate 359 is placed in the closed (that is, pass through) position. The shift register delay lines 354 and 358 are then circularly shifted. Multiplexer 353 is placed in position so that the bottom path 371 is selected. This places the data word $d_1$ at the end of delay line 354. Data word $d_1$ is then multiplied by the same PN coefficient $p_0$ by multiplier 355 and placed in the delay line 358. At this point the delay line contains the terms $d_0p_0$ and $d_1p_0$, as shown in block 410 (corresponding to line 408 for group $p_0$). Similarly the next six clock periods store into delay line 358 the data $d_2p_0$, $d_3p_0$, . . . , $d_7p_0$. At this point the multiplexer 353 is set to receive data from the upper path 372 (data word $d_8$). Register 352, delay line 354, and PN Generator 356 are then clocked once, but delay line 358 is not clocked at this time. This results in delay line 354 containing data words $d_1$ . . . $d_8$, when PN generator 356 produces output $p_1$.

The PN generator 356 next produces output $p_1$. The data word $d_0$ that was previously at the output of delay line 354 is discarded and multiplexer 353 is configured to accept data from the bottom path 371 to permit a circular shifting operation. The next 8 high speed clock cycles perform the same computations described above in which both delay line 354 and delay line 358 are circularly shifted and the contents of delay line 358 are added to the data from delay line 354. The adder circuit 357 provides the accumulation function. The output of these operations is illustrated in the $p_1$ group of FIG. 4B, with the results shown in block 411 (corresponding to line 408 for group $p_1$). After these eight cycles, register 352, delay line 354, and PN generator 356 are again clocked once with multiplexer 353 set to the upper position. Again, delay line 358 is not clocked during this period, so that at this point, delay line 354 contains data words $d_2 \ldots d_9$, when PN generator 356 produces output $p_2$.

The PN generator 356 next produces output $p_2$. The above mentioned eight cycle process is once again performed, and the result is shown in block 412 (corresponding to line 408 for group $p_2$). This entire process repeats until a frame of 1023 samples of data (or multiple thereof are processed (in a typical embodiment). At this point the dump gate 359 may be placed in an open condition so that a new set of data may be accumulated by delay line 358.

The correlation output from delay line 358 of multi correlator 370 provides a tracking signal for the I/Q input signal. This output is also input to magnitude-squaring circuit 360. Similarly, the output from each of the other multi-correlator channels (362, 363, 364) are passed through respective magnitude-squaring circuits (e.g., 365, 366, 367). The data from each magnitude-squaring circuit is combined with similar outputs from the other correlation channels through multiplexer 361 to produce the acquisition signal for the I/Q input signal.

In FIG. 4B, the last eight sums 412 shows a correlation of the data sequence $d_0, d_1, d_2, \ldots$ against the PN sequence $p_0, p_1, p_2, \ldots$ for eight successive lags (relative phasings between the two sequences). It will be appreciated that this result is very similar to the result illustrated in the FIG. 4A timing diagram with some subtle differences. As shown in FIG. 4A, the same data block is correlated against shifted versions of the PN sequence. In FIG. 4B, the same PN block is correlated against different data blocks. For most situations the difference is inconsequential. However, the circuitry of FIG. 3A is simpler than that of FIG. 3B and hence would normally be preferred.

As mentioned previously the multicorrelators 362, 363, . . . 364 each contain the same circuitry as multicorrelator 370. However, the data input to 362 (multicorrelator #2) is fed from the output of the 32-stage delay line 354 of the previous multicorrelator 370 (multicorrelator #1), and similarly, the 32-stage delay line of multicorrelator 362 feeds the input of multicorrelator 363, and so on. Thus, at the beginning of a 32 clock processing cycle, the data in the 32-stage delay line of multicorrelator 370 is delayed from the corresponding data in the 32-stage delay line of multicorrelator 362 by 32 samples, and that data in the 32-stage delay line of multicorrelator 362 is delayed from the corresponding data of multicorrelator 363 by another 32 samples, and so on. Thus, the collection of all multicorrelator circuits 370, 362, 363, . . . 364 are processing 2046 successive data samples with the same PN generator. Therefore, although FIG. 3B indicates that one PN generator is used per multicorrelator, one PN generator for the entire set of 64 multicorrelators can be utilized. That is, the output of the PN generator 356 can be sent to the mixers (corresponding to mixer 355) in each of the other multicorrelator circuits 362, 363, . . . 364. In this simplified construction, the multicorrelator circuits 362, 363, . . . 364 may have their PN generators deleted.

In an alternative embodiment of the parallel correlator 380 illustrated in FIG. 3B, the output of register 352 is input in parallel to all 64 multicorrelators, instead of each multicorrelator feeding data to the succeeding one. In this case 64 different PN generators (or one PN generator with 64 different outputs) are required, where the outputs of the PN generators of succeeding multicorrelators are displaced in time (or phase) from one another by minus 32 half-chips. In effect, this approach combines correlator 300 of FIG. 3A with the previously described correlator 380 of FIG. 3B. In this case, each multicorrelator processes 32 different correlation lags by delaying the input signal relative to a fixed PN sequence, but different multicorrelators ensure that different groups of 32 lags are processed by delaying the PN phase relative to the previous multicorrelator by 32 lags.

GPS Receiver

Figure 5:
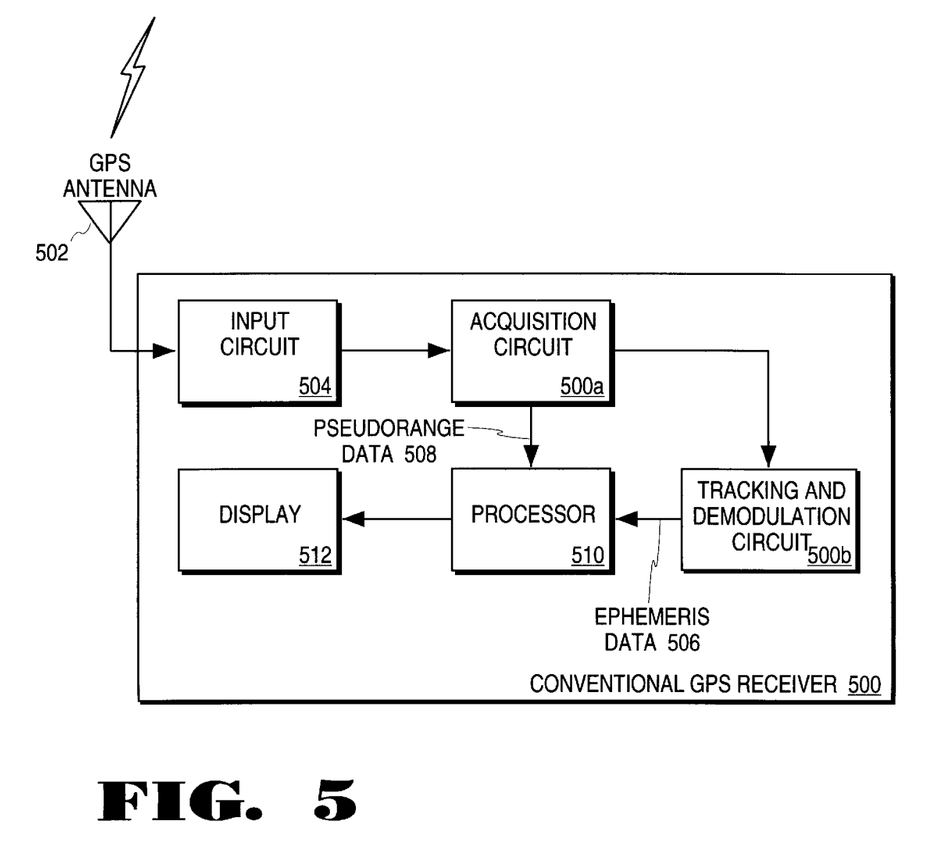
FIG. 5 is a block diagram representation of a global positioning system which implements the acquisition and tracking operations according to one embodiment of the present invention.

FIG. 5 illustrates the implementation of correlator circuit 300 in a conventional GPS receiver 500 according to one embodiment of the present invention. The GPS receiver is conventional in the sense that it receives GPS signals and determines pseudoranges and also reads the satellite data messages in the GPS signals in order to determine satellite ephemeris, and then also determines the position of the receiver from the pseudoranges and the ephemeris. GPS signals are received by GPS antenna 502 and input to GPS receiver 500 through input circuit 504. The PN codes within the received GPS signals are acquired and tracked in acquisition circuit 500a together with an external processor 510 in accordance with the operation described above with respect to FIGS. 2–4. The output of acquisition circuit 500a comprises the pseudorange data 508 corresponding to the signals received from each GPS satellite from which a signal was received. Each satellite also transmits ephemeris data 506 which is received by input circuit 504 and demodulated by tracking and demodulation circuit 500b. Processor 510 processes the ephemeris and pseudorange data to determine the location of the receiver 500. The output of processor 510 drives an input/output device such as display device 512 which graphically or textually displays the location of the receiver. In this configuration, the circuit of FIG. 3A performs both the acquisition and tracking functions together with processor 510.

Figure 6:
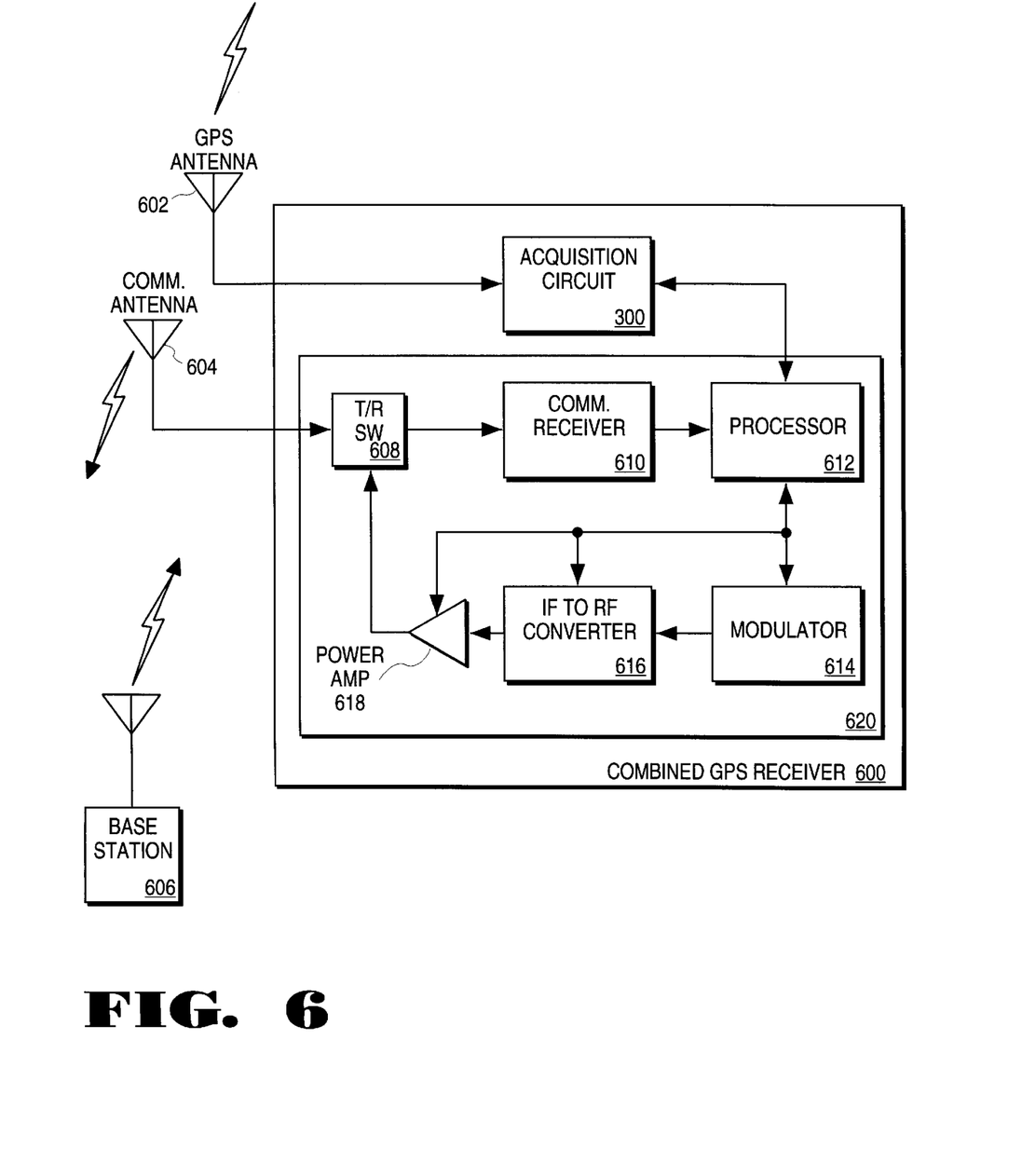
FIG. 6 shows a block diagram of a remote global positioning system which implements an acquisition circuit according to an alternative embodiment of the present invention.

FIG. 6 illustrates the implementation of acquisition circuit in a GPS receiver 600 according to an alternative embodiment of the present invention. GPS receiver 600 is a combined GPS and communication receiver transmitter. Receiver 600 contains a GPS receiver stage including acquisition circuit 300 and communication transceiver section 620. GPS signals are received through GPS antenna 602 and input to acquisition circuit 300 which acquires the PN codes for the various received satellites. The pseudorange data produced by acquisition circuit 300 are processed by processor 612 for transmittal by transceiver 620. Transceiver 620 contains a transmit/receive switch 608 which routes communication signals (typically RF) to and from communication antenna 604 and receiver 600. Received communication signals are input to communication receiver 610 and passed to processor 612 for processing. Communication signals to be transmitted from processor 612 are propagated to modulator 614 and frequency converter 616. Power amp 618 increases the gain of the signal to an appropriate level for transmission to base station 606. In the combined GPS/communication system of receiver 600, pseudorange data generated by acquisition circuit 600 is transmitted over a communication link to base station 606. Base station 606 then determines the location of receiver 600 based on the pseudorange data from the remote receiver and ephemeris data received from its own GPS receiver or other sources of such data. The location data can then be transmitted back to GPS receiver 600 or to other remote locations. The communication link between receiver 600 and base station 606 may be implemented in a number of various embodiments including a direct link or cellular phone link.

Although the methods and apparatus of the present invention have been described with reference to GPS satellites, it will be appreciated that the teachings are equally applicable to positioning systems which utilize pseudolites or a combination of satellites and pseudolites. Pseudolites are ground based transmitters which broadcast a PN code (similar to a GPS signal) modulated on an L-band carrier signal, generally synchronized with GPS time. Each transmitter may be assigned a unique PN code so as to permit identification by a remote receiver. Pseudolites are useful in situations where GPS signals from an orbiting satellite might by unavailable, such as tunnels, mines, buildings or other enclosed areas. The term "satellite", as used herein, is intended to include pseudolites or equivalents of pseudolites, and the term GPS signals, as used herein, is intended to include GPS-like signals from pseudolites or equivalents of pseudolites.

In the preceding discussion the invention has been described with reference to application upon the United States Global Positioning Satellite (GPS) system. It should be evident, however, that these methods are equally applicable to similar satellite positioning systems, such as the Russian Glonass system. The term "GPS" used herein includes such alternative satellite positioning systems, including the Russian Glonass system. The term "GPS signals" includes signals from alternative satellite positioning systems.

In the foregoing, a system has been described for receiving GPS signals through GPS receiver with a highly parallel correlator circuit. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than restrictive sense.

What is claimed is:

1. A method of processing satellite positioning system (SPS) signals, said method comprising the steps of:
   receiving a set of SPS signal samples from a particular SPS transmitter;
   performing a first correlation on said set of SPS signal samples with a first pseudorandom sequence using a first multiplier and adder to provide a first correlated result; and
   performing a second correlation on said set of SPS signal samples with a second pseudorandom sequence using said first multiplier and adder to provide a second correlated result, and wherein said second pseudorandom sequence corresponds to said first pseudorandom sequence shifted in time.

2. The method according to claim 1 further comprising the step of performing additional correlations on said set of SPS signal samples with additional pseudorandom sequences using said first adder and multiplier to provide additional correlated results, and wherein each sequence of said additional pseudorandom sequences corresponds to said first pseudorandom sequence shifted in time.

3. The method according to claim 2 wherein said set of SPS signal samples comprises a sequence of values transmitted within fixed intervals and wherein said first correlation, said second correlation, and said additional correlations are updated during each of said fixed intervals.

4. The method according to claim 2 wherein said first correlation, said second correlation, and said additional correlations together form a multi-correlation operation, and further comprising the step of inputting said set of SPS signal samples in parallel to a plurality of correlator units, and wherein
   a first correlator unit of said plurality of correlator units performs a first multi-correlation operation on said set of SPS signal samples; and
   one or more additional correlator units of said plurality of correlator units perform respective multi-correlation operations on said set of SPS signal samples, and wherein relative time shifts utilized for correlations in each of said plurality of correlator units are not identical.

5. The method according to claim 4 wherein each of said first multi-correlation operation and said one or more additional multi-correlation operations produce correlated data results, each of said correlated data results being updated within the same fixed interval.

6. The method according to claim 5 wherein at the end of a period of time corresponding to a plurality of said fixed intervals, a mathematical representation of said correlated data results is produced to form a group of terminal results corresponding to said period of time.

7. The method according to claim 6 further comprising the step of summing said group of terminal results with one or more groups of terminal results corresponding to different periods of time.

8. The method according to claim 2 further comprising the step of comparing a unique identification code contained within said set of SPS signal samples with a locally generated identification code, and wherein each of said first correlated result, said second correlated result, and said additional correlated results comprises the result of a comparison of each phase of said unique identification code with a corresponding phase of said locally generated identification code.

9. A circuit for processing satellite positioning system (SPS) signals, said circuit comprising the following:
   an input signal port for receiving a set of SPS signal samples from a particular SPS transmitting vehicle;
   a parallel correlator circuit coupled to said input signal port, said parallel correlator circuit comprising one or more correlation circuits, each correlation circuit of said one or more correlation circuits configured for
      performing a first correlation on said set of SPS signal samples with a first pseudorandom sequence using a first multiplier and adder to provide a first correlated result, and
      performing a second correlation on said set of SPS signal samples with a second pseudorandom sequence using said first multiplier and adder to provide a second correlated result, and wherein said second pseudorandom sequence corresponds to said first pseudorandom sequence shifted in time;
   a post-detection integrator circuit coupled to said parallel correlator circuit for detecting signal peaks contained within an output signal of said parallel correlator circuit;
   a processor coupled to an output of said post-detection integrator circuit; and
   a register bank coupled to said processor.

10. The circuit according to claim 9 wherein each correlation circuit of said one or more correlation circuits is further configured of for performing additional correlations on said set of SPS signal samples with additional pseudorandom sequences using said first adder and multiplier to provide additional correlated results, and wherein each sequence of said additional pseudorandom sequences corresponds to said first pseudorandom sequence shifted in time.

11. The circuit according to claim 10 wherein each of said one or more correlation circuits comprises:
   a local identification code generator;
   a multiple stage delay line coupled to said local identification code generator; and
   an adder circuit coupled to said multiple stage delay line through a feedback loop.

12. A system for processing satellite positioning system (SPS) signals transmitted from one or more SPS transmitting vehicles, said system comprising:
   means for receiving a set of SPS signal samples from a particular SPS transmitter;
   means for performing a first correlation on said set of SPS signal samples with a first pseudorandom sequence using a first multiplier and adder to provide a first correlated result; and
   means for performing a second correlation on said set of SPS signal samples with a second pseudorandom sequence using said first multiplier and adder to provide a second correlated result, and wherein said second pseudorandom sequence corresponds to said first pseudorandom sequence shifted in time.

13. The system according to claim 12 further comprising means for performing additional correlations on said set of SPS signal samples with additional pseudorandom sequences using said first adder and multiplier to provide additional correlated results, and wherein each sequence of said additional pseudorandom sequences corresponds to said first pseudorandom sequence shifted in time, and wherein said set of SPS signal samples comprises a sequence of values transmitted within fixed intervals and wherein said first correlation, said second correlation, and said additional correlations are updated during each of said fixed intervals.

14. The system according to claim 13 further comprising:
   means for inputting said set of SPS signal samples in parallel to a plurality of correlator units;
   first correlator means for performing a first multi-correlation operation on said set of SPS signal samples; and
   one or more additional correlator means for performing respective multi-correlation operations on said set of SPS signal samples, and wherein relative time shifts utilized for correlations in each of said plurality of correlator means are not identical,
   and wherein each of said first multi-correlation operation and said one or more additional multi-correlation operations produce correlated data results, each of said correlated data results updated within the same fixed interval.

15. The system according to claim 14 wherein at the end of a period of time corresponding to a plurality of said fixed intervals, a mathematical representation of said correlated data results is produced to form a group of terminal results corresponding to said period of time, said system further comprising means for summing said group of terminal results with one or more groups of terminal results corresponding to different periods of time.

16. The system according to claim 13 further comprising means for comparing a unique identification code contained within said set of SPS signal samples with a locally generated identification code, and wherein each of said first correlated result, said second correlated result, and said additional correlated results comprises the result of a comparison of each phase of said unique identification code with a corresponding phase of said locally generated identification code.

17. A method of processing satellite positioning system (SPS) signals, said method comprising the steps of:
   receiving SPS signal samples from a particular SPS transmitter;
   performing a first correlation on a pseudorandom sequence with a first set of said SPS signal samples using a first multiplier and adder to provide a first correlated result; and
   performing a second correlation on said pseudorandom sequence with a second set of said SPS signal samples using said first multiplier and adder to provide a second correlated result, and wherein said second set corresponds to said first set of said SPS signal samples shifted in time.

18. The method according to claim 17 further comprising the step of performing additional correlations on said pseudorandom sequence with additional sets of said SPS signal samples using said first adder and multiplier to provide additional correlated results, and wherein each set of said additional sets corresponds to said first set shifted in time.

19. The method according to claim 18 wherein said pseudorandom sequence comprises a sequence of values generated within fixed intervals and wherein said first correlation, said second correlation, and said additional correlations are updated during each of said fixed intervals.

20. The method according to claim 18 wherein said first correlation, said second correlation, and said additional correlations together form a multi-correlation operation, and further comprising the step of inputting said SPS signal samples in parallel to a plurality of correlator units, and wherein
   a first correlator unit of said plurality of correlator units performs a first multi-correlation operation on said pseudorandom sequence; and
   one or more additional correlator units of said plurality of correlator units perform respective multi-correlation operations on said pseudorandom sequence, and wherein relative time shifts utilized for correlations in each of said plurality of correlator units are not identical.

21. The method according to claim 20 wherein each of said first multi-correlation operation and said one or more additional multi-correlation operations produce correlated data results, each of said correlated data results being updated within the same fixed interval.

22. The method according to claim 20 wherein at the end of a period of time corresponding to a plurality of said fixed intervals, a mathematical representation of said correlated data results is produced to form a group of terminal results corresponding to said period of time.

23. The method according to claim 22 further comprising the step of summing said group of terminal results with one or more groups of terminal results corresponding to different periods of time.

24. The method according to claim 18 further comprising the step of comparing a unique identification code contained within said set of SPS signal samples with a locally generated identification code, and wherein each of said first correlated result, said second correlated result, and said additional correlated results comprises the result of a comparison of each phase of said unique identification code with a corresponding phase of said locally generated identification code.

25. A circuit for processing satellite positioning system (SPS) signals, said circuit comprising the following:

an input signal port for receiving SPS signal samples from a particular SPS transmitting vehicle;

a parallel correlator circuit coupled to said input signal port, said parallel correlator circuit comprising one or more correlation circuits, each correlation circuit of said one or more correlation circuits configured for performing a first correlation on a pseudorandom sequence with a first set of said SPS signal samples using a first multiplier and adder to provide a first correlated result, and performing a second correlation on said pseudorandom sequence with a second set of said SPS signal samples using said first multiplier and adder to provide a second correlated result, and wherein said second set corresponds to said first set sequence shifted in time;

a post-detection integrator circuit coupled to said parallel correlator circuit for detecting signal peaks contained within an output signal of said parallel correlator circuit;

a processor coupled to an output of said post-detection integrator circuit; and a register bank coupled to said processor.

26. The circuit according to claim 25 wherein each correlation circuit of said one or more correlation circuits is further configured for performing additional correlations on said pseudorandom sequence with additional sets of said SPS signal samples using said first adder and multiplier to provide additional correlated results, and wherein each set of said additional sets corresponds to said first set shifted in time.

27. The circuit according to claim 26 wherein each of said one or more correlation circuits comprises:

a local identification code generator;

a multiple stage delay line coupled to said local identification code generator; and an adder circuit coupled to said multiple stage delay line through a feedback loop.

* * * * *